No. 790,602. PATENTED MAY 23, 1905.
J. E. SWENDEMAN.
STEAM TRAP.
APPLICATION FILED MAR. 1, 1905.

2 SHEETS—SHEET 1.

WITNESSES.
Fred. E. Dow.
J. E. Maloney.

INVENTOR.
Joseph E. Swendeman
by F. E. Tetchemacher
Atty

No. 790,602. PATENTED MAY 23, 1905.
J. E. SWENDEMAN.
STEAM TRAP.
APPLICATION FILED MAR. 1, 1905.
2 SHEETS—SHEET 2.
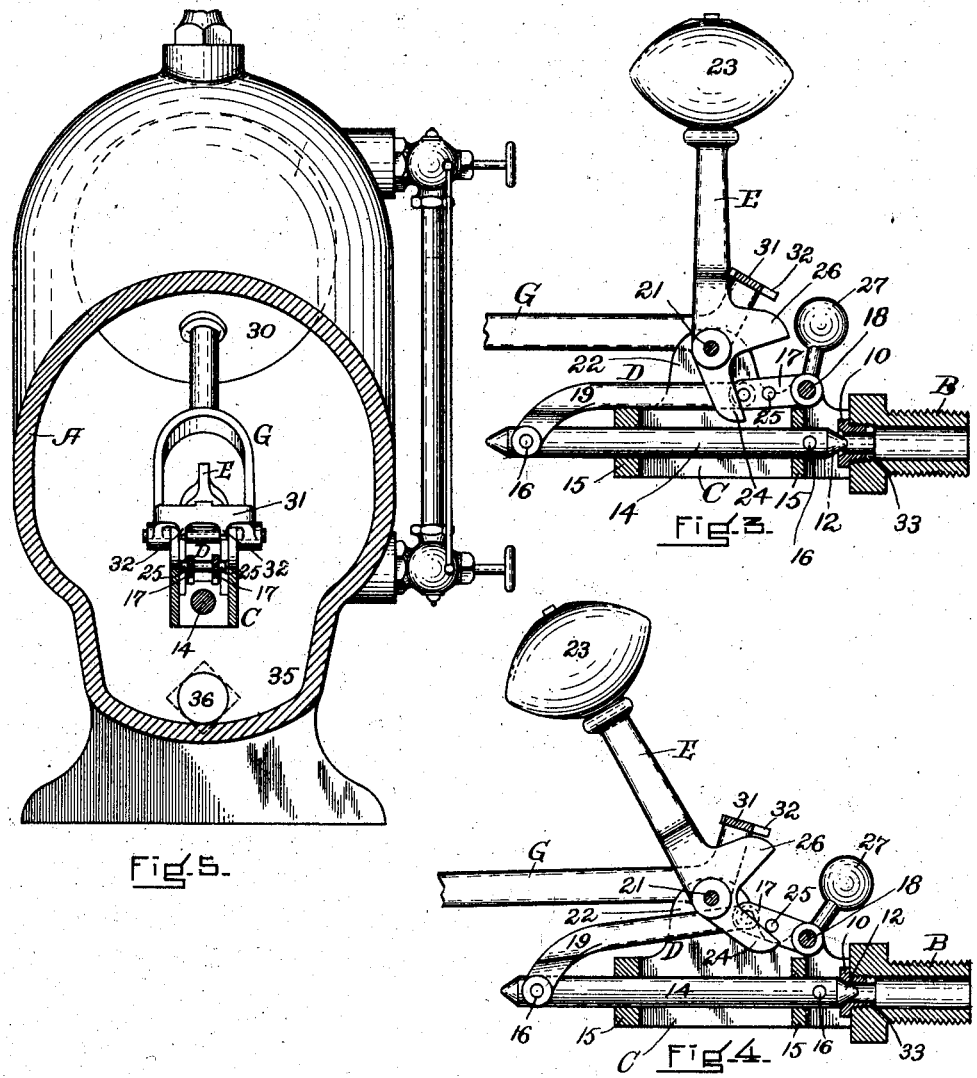
WITNESSES.
Fred. E. Dorr.
J. E. Maloney.
INVENTOR.
Joseph E. Swendeman
by S. P. Teschemacher
Atty No. 790,602. Patented May 23, 1905.

UNITED STATES PATENT OFFICE.

JOSEPH E. SWENDEMAN, OF BOSTON, MASSACHUSETTS.

STEAM-TRAP.

SPECIFICATION forming part of Letters Patent No. 790,602, dated May 23, 1905.

Application filed March 1, 1905. Serial No. 247,960.

*To all whom it may concern:*

Be it known that I, JOSEPH E. SWENDEMAN, a citizen of the United States, residing at Boston, in the county of Suffolk and State of Massachusetts, have invented certain Improvements in Steam-Traps, of which the following is a specification.

My invention has for its object to simplify and improve the construction of steam-traps, whereby all leakage is avoided, and the consequent cutting of the valve and valve-seat by the "wire-drawing" of escaping steam thus absolutely prevented.

With these ends in view my invention consists in certain novel features, combination of parts, and details of construction, as will be hereinafter fully described, and pointed out in the claims.

Figure 1:
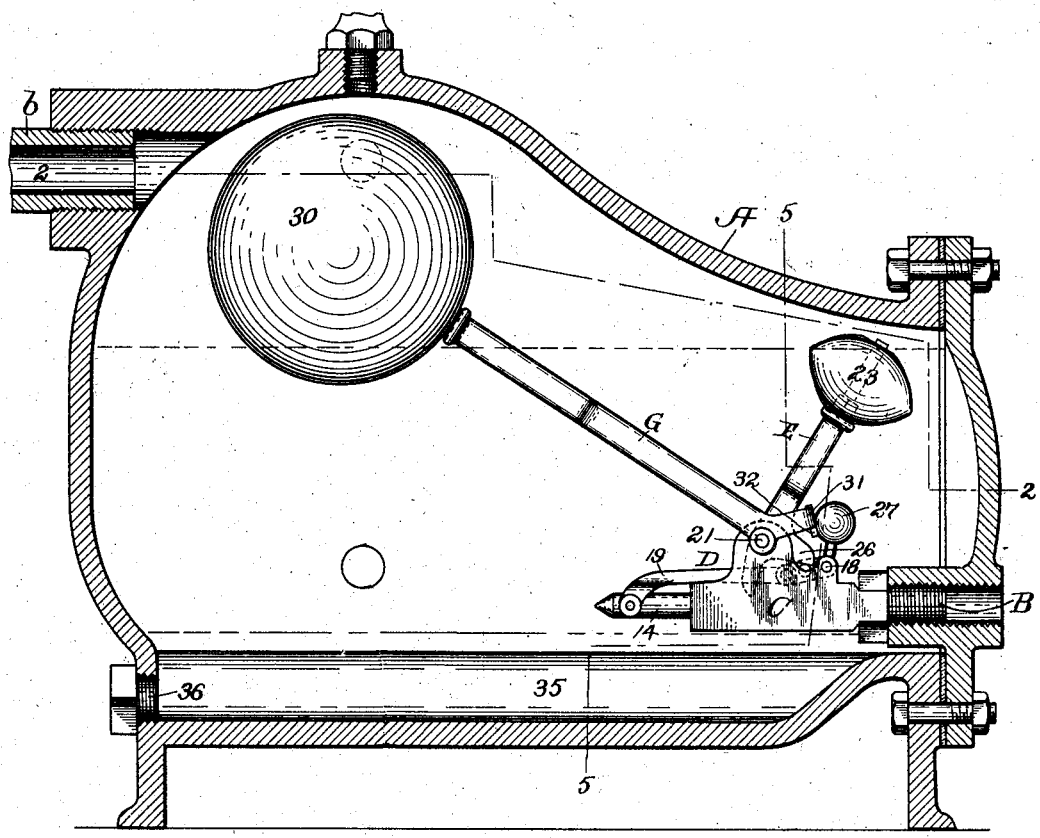
Figure 2:
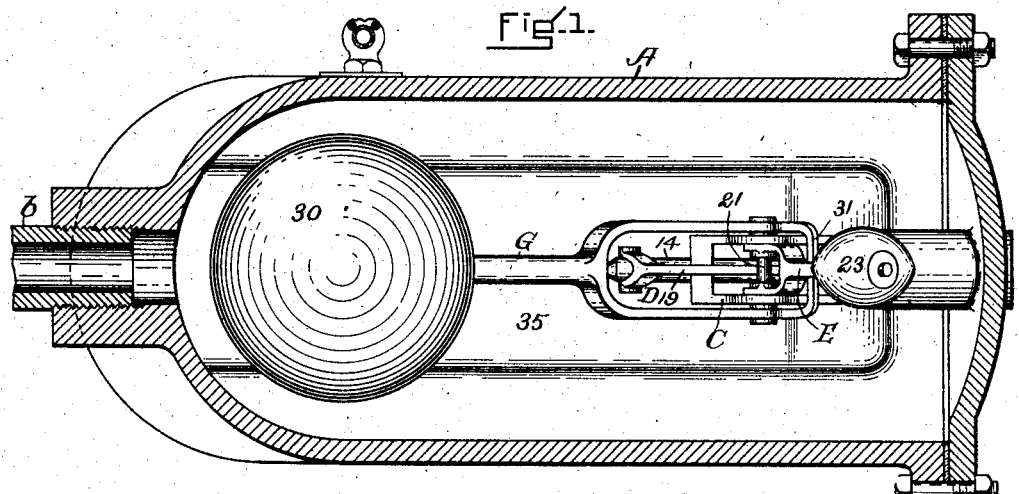

In the accompanying drawings, Figure 1 is a central longitudinal sectional elevation of a steam-trap embodying my invention, the valve-operating mechanism being shown in the position which it occupies at the moment the discharge-valve is opened. Fig. 2 is a sectional plan taken on the line 2 2 of Fig. 1. Fig. 3 is an enlarged sectional elevation of the valve mechanism, showing the weighted tumbling-arm in a vertical position and just ready to fall over to the left-hand side to close the valve. Fig. 4 is a similar elevation showing the position of the valve mechanism when the float has reached its lowest position and the discharge-valve has been closed. Fig. 5 is a transverse section on the line 5 5 of Fig. 1.

Referring to the drawings, A represents the shell or body of the trap, and $b$ the inlet-pipe through which the steam and water of condensation from the radiators of a heating plant or other source enter the trap.

B is the discharge or outlet pipe, which enters the trap near the bottom and is provided with a conical valve-seat 10, said outlet-pipe, which is adapted to be at all times beneath the surface of the water in the trap, being adapted to be connected with a pipe through which the water from the trap passes to a hot-well, tank, or other receiver. To the valve-seat 10 is fitted with a ground-joint a conical valve 12, movable horizontally toward and from said seat, the stem 14 of said valve sliding in suitable bearings 15 15 in a supporting-frame C, secured to or cast integral with the outlet-pipe B.

D is a toggle, the short member 17 of which is pivoted to the frame C at 18 and the long member 19 to the inner end of the valve-stem 14.

E is a tumbling-arm, the lower forked end of which is pivoted on a pin 21, passing through ears 22 on the frame C, said arm carrying at its upper end a weight 23. The forked portion of the tumbling-arm E embraces the toggle D, and the lower ends 24 24 of said forked portion are adapted when the arm is rocked over to the left to be brought into contact with pins or projections 25 25 on the short member of the toggle, thereby raising it and causing the long member 19 of said toggle to force the valve-stem connected therewith forward, and thus tightly close the valve 12 against its seat 10. At the upper end of the forked portion of the tumbling-arm are two projections 26 26 of the form shown, which when the tumbling-arm is rocked over the center to the right are brought into contact with the upper sides of said pins or projections 25 of the toggle, by which the latter is depressed, carrying the valve-stem 14 backward and causing the valve to be instantly thrown wide open. When the parts are in this position, the knuckle-joint of the toggle is below the center, and consequently the valve is positively held wide open and locked against any steam-pressure which may be exerted against the inner end of the valve-stem and will remain open until closed by the movement of the tumbling-arm in the opposite direction, the above construction thus insuring the valve being always either wide open or tightly closed. The shorter member 17 of the toggle is preferably provided with a weighted arm 27, as shown, which acts to keep the toggle raised and the valve closed when the trap is not under pressure. The tumbling-arm E acts on the toggle at a point where it will exert the greatest leverage to enable it to easily open the valve against the pressure of the steam on the inner end of the valve-stem, and when the valve is closed the pressure of the steam on the inner end of the valve-stem will maintain the valve in this position without any possibility of leakage, as the valve is ground to its seat and will be held against the same with a force proportioned to the pressure of the steam.

The above-described construction insures the valve being kept tightly closed without leakage until the water of condensation has reached its high level and then instantly thrown wide open and kept so until the required amount of water of condensation has been discharged and then again instantly closed tight, whereby all liability of the valve and valve-seat being cut by wire-drawing produced by escaping steam is entirely avoided.

G is a lever, the inner end of which is made in the form of a loop or link, through which the tumbling-arm E projects, the side bars of said lever being fulcrumed on the pin 21, and to the outer end of this lever G is secured a hollow float 30, adapted to rest upon the surface of the water in the trap and rise and fall therewith, whereby the opposite sides of the cross-bar 31, which forms the inner end of the lever G, are brought alternately into contact with the said tumbling-arm to rock or oscillate it around the pivot-pin 21 and cause it to actuate the toggle D and valve-stem 14, connected therewith, as previously described. One side of the bar 31 is preferably provided with projections 32 32, which are brought into contact with the projections 26 26 of the tumbling-arm, while the opposite side of the bar 31 is adapted to be brought into contact with said arm E just above its forked portion.

The valve-seat 10 is preferably made of phosphor-bronze, nickel, or other suitable wear-resisting material and is threaded on the outside and screwed into the outlet-pipe, thereby making it removable, so that it can be replaced by one having an opening of different area, if desired, and to facilitate the removal of the valve-seat it is provided at its rear end with a notch or nick 33, whereby it may be turned in and out by means of a screw-driver inserted from the nipple end of the outlet-orifice. The valve-stem is made conical at both ends, so that either end may form the valve, and to enable this to be done a hole 16 is drilled near each end of the stem to receive the pivot-pin by which it is connected with the long member of the toggle D.

The weight on the tumbling-arm should be proportioned to the pressure of the steam under which the trap is intended to be worked, and said weight is preferably made pointed at its opposite ends, as shown, so as to offer the least resistance in entering the water as it falls over when the trap is full.

At the bottom of the casting is formed a sediment-chamber 35, which consists of a depression extending lengthwise of the casing A and having a discharge or clean-out opening 36 at one end of the casing, provided with a cap or plug whereby access can be had to the chamber 35 with a rod to loosen the sediment, and thereby facilitate its discharge.

The operation of the above-described trap is as follows: The parts being in the position shown in Fig. 4, with the water at its lowest level and the valve 12 closed, as the water of condensation begins to fill the trap the float 30, with its lever G, rises, causing the projections 32 of the cross-bar 31 of the float-lever to be brought into contact with the projections 26 of the weighted tumbling-arm E, which is thus raised until it reaches a vertical position, which occurs immediately before the water attains its highest level. As soon as the tumbling-arm is carried over the center by a slight additional rise of the float it will fall over to the right-hand side, causing the projections 26 to strike the pins 25 of the short member of the toggle, which is then carried down into the position shown in Fig. 1, where it is arrested by the contact of its longer member 19 with the frame C, the valve being then wide open. The pressure of the steam now causes the water to pass through the valve and discharge-pipe B and out of the trap without any escape of steam, the float falling with the water until the side of the bar 31 opposite to that which carries the projections 32 contacts with and raises the tumbling-arm again to a vertical position, as shown in Fig. 3, a farther descent of the float causing it to be carried past the center, when it will fall over to the left-hand side, as shown in Fig. 4, causing its lower ends 24 24 to strike the under sides of the pins 25 of the toggle D, thus raising the same and instantly closing the valve, the water at its lowest level being always above the valve, thereby rendering it impossible for any steam to escape. The water of condensation then again begins to fill the trap and the operation continues as before.

What I claim as my invention, and desire to secure by Letters Patent, is—

1. A steam-trap comprising a shell or body having an inlet, a discharge-pipe provided with a valve-seat, a valve movable toward and away from said valve-seat, a weighted tumbling-arm adapted to operate said valve, a pivoted float-lever and float adapted to move the tumbling-arm alternately in opposite directions, and means actuated by the tumbling-arm for positively locking the valve in its wide-open position.

2. A steam-trap comprising a shell or body having an inlet, a discharge-pipe provided with a valve-seat, a valve movable toward and away from said valve-seat, a weighted tumbling-arm, a pivoted float-lever and float adapted to move the tumbling-arm alternately in opposite directions, and means consisting of a toggle having one member connected with the valve-stem and the other member with a fixed support and adapted to be operated by the tumbling-arm for opening and closing the valve and locking said valve in its wide-open position.

3. In a steam-trap, the combination with the discharge-pipe provided with a valve-seat and having a supporting-frame connected therewith, of a valve movable toward and away from said valve-seat and having a stem sliding in said supporting-frame, a toggle having a long member connected with said valve-stem and a short member pivoted to said supporting-frame, a weighted tumbling-arm pivoted at its lower end and adapted to alternately operate said toggle in opposite directions to thereby open and close the valve and lock the same when wide open, and a lever provided with a float and adapted to engage the tumbling-arm and raise and carry it beyond the center alternately in opposite directions to act as it falls on said toggle.

4. The combination with the valve and valve-stem, of the toggle connected with the latter and adapted to open and close said valve and having its shorter member provided with a weighted arm adapted to hold the toggle in a raised position, the tumbling-arm adapted to actuate the toggle in opposite directions, and the float-lever and float for moving the tumbling-arm alternately in opposite directions and carrying it beyond the center to act as it falls on said toggle.

5. In a steam-trap, the combination with the discharge-pipe provided with a valve-seat and having a supporting-frame connected therewith, of a valve movable toward and away from said valve-seat and having a stem sliding in said supporting-frame, a toggle having a long member connected with said valve-stem and a short member pivoted to the supporting-frame and provided with a weighted arm and with pins or projections near the joint, a weighted tumbling-arm pivoted to the supporting-frame and forked at its lower end to embrace the toggle, and having the lower ends of its forks adapted to contact with the pins or projections of the short member of the toggle to raise said toggle, and projections above said ends adapted to contact with the opposite sides of said pins or projections to depress the toggle, and a float-lever, the latter having a looped portion through which said tumbling-arm projects and adapted to actuate the tumbling-arm in opposite directions to cause it in its fall to operate the said toggle and thereby open and close the valve.

Witness my hand this 28th day of February, A. D. 1905.

JOSEPH E. SWENDEMAN.

In presence of—
   P. E. Teschemacher,
   J. E. Mahoney.